(12) United States Patent
Schultz et al.

(10) Patent No.: US 7,347,132 B2
(45) Date of Patent: Mar. 25, 2008

(54) SHEET CUTTER

(75) Inventors: Richard J. Schultz, Barrington, IL (US); Hideki Koto, Yotsukaido (JP)

(73) Assignee: CARL Manufacturing USA Inc., Mount Prospect, IL (US)

( * ) Notice: Subject to any disclaimer, the term of this patent is extended or adjusted under 35 U.S.C. 154(b) by 0 days.

(21) Appl. No.: 10/429,061

(22) Filed: May 2, 2003

(65) Prior Publication Data

US 2004/0216571 A1 Nov. 4, 2004

(51) Int. Cl.
*B26D 1/18* (2006.01)

(52) U.S. Cl. .......................................... 83/485; 83/614

(58) Field of Classification Search .................. 83/614, 83/827, 828, 574, 485
See application file for complete search history.

(56) References Cited

U.S. PATENT DOCUMENTS

| | | | | |
|---|---|---|---|---|
| 3,368,594 A | * | 2/1968 | Drumbore | 83/468.3 |
| 3,741,063 A | * | 6/1973 | Bretthauer | 83/745 |
| 3,964,360 A | * | 6/1976 | Schwartz | 83/464 |
| 4,489,634 A | * | 12/1984 | Volk | 83/522.28 |
| 4,516,324 A | * | 5/1985 | Heininger et al. | 30/377 |
| 5,322,001 A | * | 6/1994 | Boda | 83/485 |
| 5,442,984 A | * | 8/1995 | Tate | 83/471.2 |
| 5,802,942 A | * | 9/1998 | Cornell et al. | 83/455 |
| 6,460,443 B1 | * | 10/2002 | Hsiao | 83/614 |
| 2003/0140757 A1 | * | 7/2003 | Carlson et al. | 83/485 |
| 2003/0140760 A1 | * | 7/2003 | Bory | 83/614 |

* cited by examiner

*Primary Examiner*—Kenneth E. Peterson
(74) *Attorney, Agent, or Firm*—Wood, Phillips, Katz, Clark & Mortimer (57) ABSTRACT

The combination of a sheet cutting apparatus and a tool. The sheet cutting apparatus has a base with a surface for supporting a sheet material operatively positioned upon the base. A rail assembly on the base has a length. The sheet cutting apparatus further includes a blade assembly. The blade assembly has an operative state in which the blade assembly is movable guidingly in a cutting path along the length of the rail assembly to make a cut in a sheet material operatively positioned upon the base, and is repositionable relative to the rail assembly from the operative state into a separated state. The tool is operable by a user to facilitate repositioning of the blade assembly from the operative state into the separated state.

24 Claims, 9 Drawing Sheets

SHEET CUTTER

BACKGROUND OF THE INVENTION

1. Field of the Invention

This invention relates to cutters for sheet material and, more particularly, to a sheet cutter having a separable blade assembly.

2. Background Art

A myriad of different cutters for sheet material are currently available on the market. Among the many uses for these cutters are the trimming of photographs, cutting of plain papers and light cardboard, etc. One popular design used for this purpose has a base with a flat surface for supporting the sheet material to be cut and a rail assembly which overlies the base support surface. The rail assembly has a flat surface which faces the base support surface. Between the rail assembly and base support surfaces, a space is defined within which the sheet material to be cut is situated. A blade assembly is mounted to the rail assembly for guided movement in a linear cutting path.

An exemplary structure having this design is shown in U.S. Pat. No. 5,671,647, assigned to Carl Manufacturing Co., Ltd. In this particular device, the rail assembly has spaced rail portions which define a guide slot for the blade assembly. Each rail portion has an edge which bounds the slot. The blade assembly has spaced, oppositely opening, U-shaped receptacles to engage, one each, with a rail edge. Each U-shaped receptacle is bounded by upwardly and downwardly facing surfaces to confine vertical movement of the edges therewithin.

In one version of this cutter, the blade assembly and rail assembly are designed so that the blade assembly can be placed relative to the rail assembly selectively in a) an operative state and b) a separated state, with the latter facilitating replacement or repair of the blade assembly. With the blade assembly in the operative state, the rail portion edges reside within the first and second receptacles so that the blade assembly is guided in the cutting path by the rail assembly. The orientation of the blade assembly relative to the rail assembly is maintained by the interaction of the rail portions with base surfaces bounding each of the U-shaped first and second receptacles. These base portions have a sufficient length to resist skewing of the blade assembly during operation.

To place the blade assembly in its separated state, the spacing between the edges of the rail portions must be increased sufficiently to allow the rail portion edges to be withdrawn from both the first and second receptacles on the blade assembly. In one commercial version, separation is effected by having the user grasp the blade assembly, as between the fingers, and manually exert a force sufficient to wedge the rails apart. This action can be assisted by drawing the blade assembly with one hand and producing a separating force on the rail portions with the other. Since the blade assemblies are generally quite small, they generally do not lend themselves to being positively grasped to effect extraction of the blade assembly from the rail assembly guide slot. This may lead to situations where the blade assembly ultimately springs from the slot, as a result of which it might have to be recovered by the operator. Alternatively, during the extraction process, the blade assembly may reorient so that the cutting blade undesirably becomes exposed to the user. This same problem is potentially encountered as the separated blade assembly is pressed against the rail portions to effect installation thereof.

Designers of these cutting devices generally anticipate that users will wish to simultaneously cut multiple sheets of material. In U.S. Pat. No. 5,671,647, a construction is disclosed wherein the rail assembly is flexible so that it can be pressed towards the base support surface to squeeze different numbers of layers of the captive sheet material to maintain the same fixedly in a desired location during the cutting operation. This captive force is increased and maintained by exerting a force on the rail assembly through the blade assembly as the cutting operation is carried out.

One potential problem with cutting apparatus of this type is that, while the sheet material may be positively held for a true cut, the blade assembly is prone to deviating from its intended path. This is a problem that may be introduced by making the blade assembly separable from the rail assembly, as described above. The flexibility built into the rail portions, which permits them to be moved apart to allow the blade assembly to be extracted, inherently introduces the opportunity for the blade to shift off its intended linear path. This problem can be addressed by making the rail portions more rigid. However, this inherently makes the blade removal and assembly processes more difficult. Consequently, it has been common to make the rail portions less than optimally rigid to facilitate blade assembly, separation, and reinstallation. As a result, some of the desired accuracy may be forfeited, particularly when multiple layers of sheet material are being cut and a greater advancing force is being applied by the operator to the blade assembly.

SUMMARY OF THE INVENTION

In one form, the invention is directed to the combination of a sheet cutting apparatus and a tool. The sheet cutting apparatus has a base with a surface for supporting a sheet material operatively positioned upon the base. A rail assembly on the base has a length. The sheet cutting apparatus further includes a blade assembly. The blade assembly has an operative state in which the blade assembly is movable guidingly in a cutting path along the length of the rail assembly to make a cut in a sheet material operatively positioned upon the base, and is repositionable relative to the rail assembly from the operative state into a separated state. The tool is operable by a user to facilitate repositioning of the blade assembly from the operative state into the separated state.

The combination may further include a container for maintaining the sheet cutting assembly and tool in a unitary package.

In one form, the rail assembly has first and second rail portions between which a part of the blade assembly resides with the blade assembly in the operative state. The rail portions are spaced from each other a first distance with the blade assembly in the operative state. The rail portions can be repositioned and spaced from each other a second distance that is greater than the first distance to allow repositioning of the blade assembly from the operative state into the separated state.

In one form, the blade assembly has oppositely opening, U-shaped, first and second receptacles. With the blade assembly in the operative state, the first rail portion resides in the first receptacle and the second rail portion resides in the second receptacle.

In one form, the first receptacle is bounded by a first base portion with the second receptacle bounded by a second base portion. The first rail portion has a first edge, with the second rail portion having a second edge. The first and second base portions and first and second edges are movable guidingly, one against the other, as the blade assembly moves along the cutting path.

In one form, the tool is configured to cam the rail portions from a first relative position, wherein the rail portions are spaced from each other the first distance, into a second relative position wherein the rail portions are spaced from each other the second distance, by aligning the tool in a first orientation and exerting a force on the tool, and through the tool, against the rail assembly.

In one form, the tool has a first cam edge which acts against the first and second rail portions to produce a wedging action as a force is exerted on the tool with the tool in the first orientation.

In one form, the tool has spaced first and second legs which are capable of straddling a portion of the blade assembly, and the first cam edge is defined on the first leg.

In one form, the second leg has a second cam edge which acts against the first and second rail portions simultaneously with the first cam edge to produce a wedging action as a force is exerted on the tool with the tool in the first orientation.

In one form, the tool has a first leg on which the first cam edge is defined and there is a first projection on one of the first leg and blade assembly and a first guide receptacle for the first projection on the other of the first leg and blade assembly. The first projection and guide receptacle cooperate to guide movement of the tool in a predetermined path relative to the blade assembly with the tool in the first orientation to cause the first cam edge to produce the wedging action.

In one form, there is a first projection on the first leg and a second projection on the second leg. The blade assembly has first and second guide receptacles. The first and second projections are movable respectively in the first and second guide receptacles with the tool in a first orientation and a force exerted on the tool to guide movement of the tool in a predetermined path to cause the first cam edge to produce the wedging action.

In one form, the tool is movable relative to the blade assembly from a first separated position into a second position. The first projection has a first shoulder and the blade assembly has a second shoulder. With the tool in the second position, the first and second shoulders are situated in confronting relationship whereby a force can be exerted on the tool to bear the first shoulder against the second shoulder so as to thereby draw the blade assembly from the operative state towards the separated state.

In one form, the second projection has a third shoulder and the blade assembly has a fourth shoulder and with the tool in the second position, the third and fourth shoulders are situated in confronting relationship whereby a force can be exerted on the tool to simultaneously bear the third shoulder against the fourth shoulder and the first shoulder against the second shoulder so as to thereby draw the blade assembly from the operative state towards the separated state.

In one form, the first and second projections project towards each other and are spaced from each other a first distance. As the tool is changed from the first position into the second position, a portion of the blade assembly having a width greater than the first distance passes between the first and second projections and at least one of the first and second legs is repositionable to allow the projections to become spaced from each other by a distance greater than the first distance to allow the projections to move past the portion of the blade assembly.

In one form, the at least one of the first and second legs and blade assembly have cam surfaces which cooperate to bias the at least one leg away from the other leg as the tool is moved from the first position into the second position.

The tool may be U-shaped with a base from which the first and second legs project.

In one form, the base has oppositely opening receptacles within which a user's fingers can be situated to grasp the tool.

In one form, the first and second legs have substantially the same shape and are situated to be mirror images of each other.

The tool may be molded as a single piece from plastic.

In one form, the first guide receptacle terminates at a first shoulder ad the second guide receptacle terminates at a second shoulder. The first and second projections are abuttable respectively to the first and second shoulders to allow a force to be exerted on the tool which causes the blade assembly to be urged into the operative state.

In one form, the projections produce a captive, bias force against the blade assembly with the first and second projections at or adjacent to the first and second shoulders so that the tool and blade assembly are releasably maintained together.

The invention is also directed to a method of repositioning a blade assembly on a sheet cutter having a rail assembly and a base. The method includes the steps of: providing a tool; engaging the tool with the blade assembly; and by repositioning the tool, causing a part of the rail assembly to be reconfigured to allow the blade assembly to be changed from a) an operative state wherein the blade assembly is movable guidingly along the rail assembly in a cutting path, and b) a separated state.

The method may further include the step of using the tool to change the blade assembly from the separated state into the operative state.

The step of using the tool to change the blade assembly from the separated state into the operative state may involve placing the tool against the blade assembly and exerting a pressing force on the tool and thereby the blade assembly.

The step of engaging the tool with the blade assembly may involve placing first and second legs on the tool in straddling relationship with the blade assembly.

In one form, the step of engaging the tool with the blade assembly involves moving the tool from a first separated position into a second position and causing at least one of the first and second legs to reposition to allow a) the first and second legs to assume the straddling relationship with the blade assembly and b) a first shoulder on the tool to be placed in confronting relationship with a second shoulder on the blade assembly so that a force exerted on the tool bears the first shoulder against the second shoulder to allow the blade assembly to thereby be drawn out of the operative state through the tool.

BRIEF DESCRIPTION OF THE DRAWINGS

FIG. 14 is an enlarged, elevation view of the change tool of FIG. 5;

FIGS. 15-17 are each enlarged, fragmentary, partial cross-sectional, views showing the cooperation between the change tool and rail assembly between first and second positions in FIGS. 15 and 17, with: FIG. 15 showing the change tool in a first orientation and engaged with the blade assembly and abutted to rail portions which bound a slot on the rail assembly; FIG. 16 showing the change tool moved downwardly from the FIG. 15 position to enlarge the slot to allow the blade assembly to be withdrawn; and FIG. 17 showing the blade assembly being separated from the rail assembly with the change tool;

FIGS. 18-21 show a similar sequence of relative movement between the change tool and blade assembly, with the views in FIGS. 18-21 rotated 90° from those in FIGS. 15-17 and with: FIG. 18 showing the change tool fully separated from the blade assembly; FIG. 19 showing the change tool in a position wherein it releasably, biasably holds the blade assembly; FIG. 20 showing legs on the change tool spread to allow further downward movement thereof; and FIG. 21 showing the legs on the change tool sprung back and the change tool in a second position wherein it positively holds the blade assembly and can be repositioned to separate the blade assembly from the operative state.

DETAILED DESCRIPTION OF THE DRAWINGS

Figure 1:
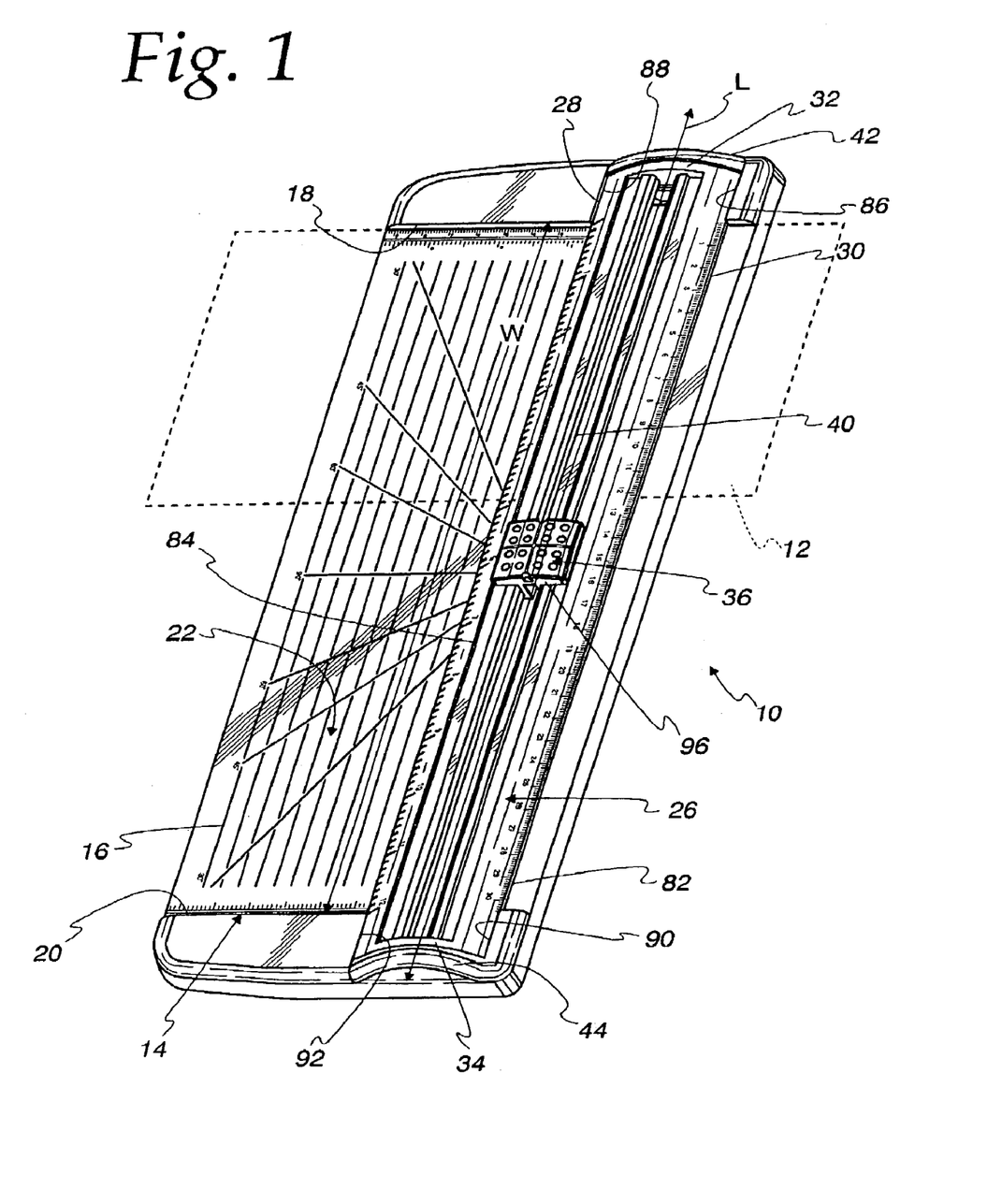
FIG. 1 is a perspective view of a sheet cutting apparatus of the type with which the present invention can be practiced and including a base, a rail assembly overlying the base, and a cutting blade assembly which is movable in a cutting path guidingly along the rail assembly.
Figures 2, 3:
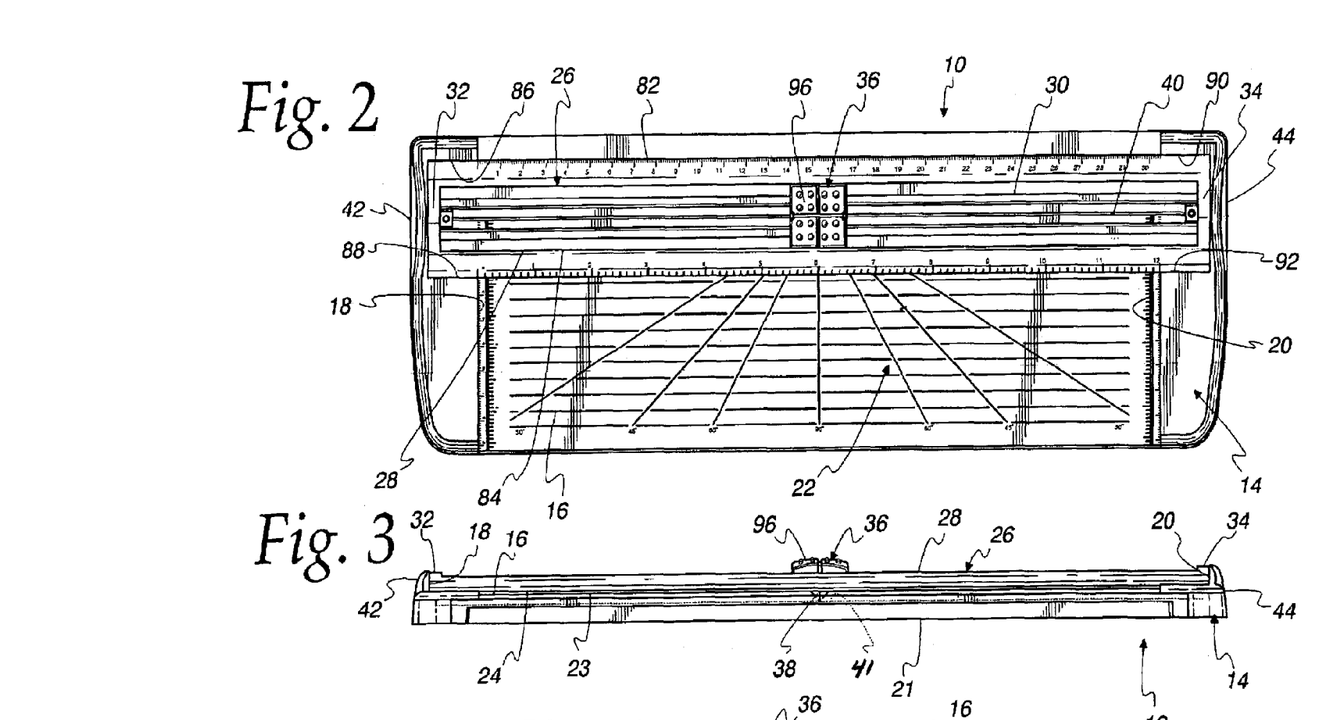
FIG. 2 is a plan view of the sheet cutting apparatus of FIG. 1.
FIG. 3 is a front elevation view of the sheet cutting apparatus of FIGS. 1 and 2.
Figure 4:
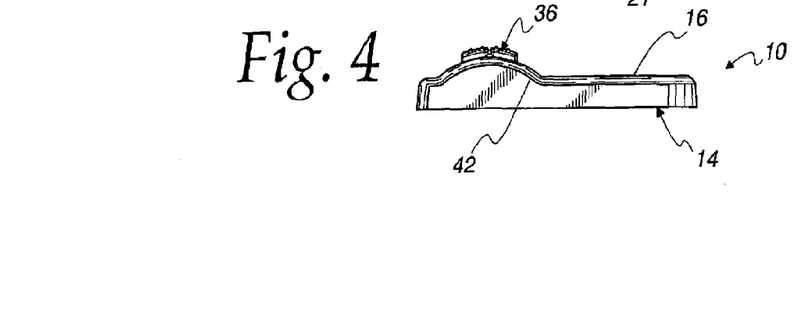
FIG. 4 is a side elevation view of the sheet cutting apparatus of FIGS. 1-3.
Figure 5:
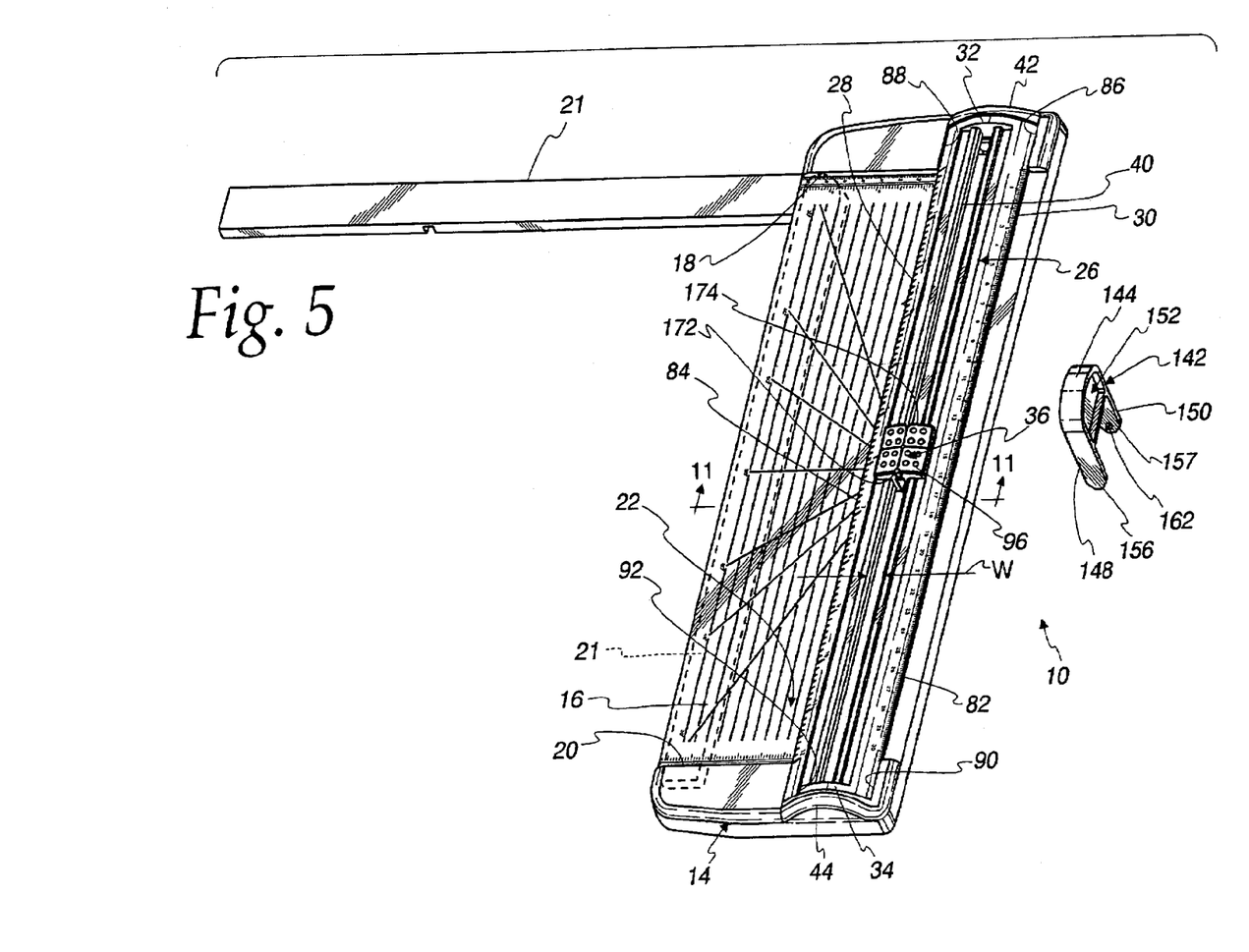
FIG. 5 is a view as in FIG. 1 with an extension ruler reoriented to facilitate handling of larger sheet material and in combination with a change tool which is used, according to the present invention, to facilitate installation and removal of the cutting blade assembly.

Referring initially to FIGS. 1-5, a sheet cutting apparatus, according to the present invention, is shown at 10. The sheet cutting apparatus is useable to cut/trim sheet product 12 (FIG. 1). The sheet product 12 may be paper, such as used for letters or processing photographs, light cardboard, or other sheet material that lends itself to being severed by a translating cutting blade.

The sheet cutting apparatus 10 has a generally rectangular base 14 having a flat, upwardly facing surface 16 to support the sheet material 12 strategically for a cutting/trimming operation. The support surface 16 is bounded by spaced edges 18, 20, which determine the cutting width capacity W (FIG. 1) of the sheet cutting apparatus 10. An elongate ruler element 21 is pivotable between an operative position, as shown in solid lines in FIG. 5, and a stored position, as shown in dotted lines in FIG. 5 and in solid lines in FIG. 3. In the operative position, the ruler element 21 extends the effective support area for the surface 16. The edges 18, 20 extend parallel to each other and orthogonal to a cutting line L (FIG. 1) as will be explained in greater detail below. The support surface 16 has markings and graduations 22 thereon to facilitate strategic placement of the sheet material 12 preparatory to a cutting/trimming operation.

The basic sheet cutting apparatus 10 has the capacity to cut/trim a single layer, or multiple layers, of sheet material 12. The sheet material 12 that is to be cut/trimmed is placed upon the support surface 16 and directed to within a space 23 (see also FIG. 8) defined between a flat, downwardly facing surface 24 on a rail assembly 26 and the underlying, upwardly facing support surface 16. The rail assembly 26 is mounted so as to "float" vertically to allow the vertical dimension of the space 23 to be varied.

More particularly, the rail assembly 26 incorporates aspects of the design disclosed in U.S. Pat. No. 5,671,647, to Mori, which is incorporated herein by reference. As seen additionally in FIGS. 6-10, the rail assembly 26 consists of first and second elongate rail portions 28, 30 united by curved, opposite end portions 32, 34. As hereinafter described, a blade assembly 36, having a cutting blade 38 (FIG. 3), is mounted to the rail portions 28, 30 to be guided in the cutting path within an elongate slot 40, defined between the rail portions 28, 30. The cutting blade 38 projects downwardly into an elongate depression 41 in the support surface 16 so that the cutting blade 38 consistently extends fully through the sheet product thereon to ensure complete cutting thereof.

The base 14 has convexly shaped, raised portions 42, 44 which respectively define receptacles 46, 48 (FIG. 10) for the end portions 32, 34, respectively. The raised portions 42, 44 have edges 50, 51 at the entries to the receptacles 46, 48. The edges 50, 51 are spaced from each other a distance L1, which is less than the combined length L2 of the rail portions 28, 30 and end portions 32, 34 between the edges 52, 53 thereof, with the rail assembly 26 in a relaxed state. To install the rail assembly 26, the rail assembly 26 is bowed, as shown in an exaggerated manner in FIG. 10, to reduce the effective length dimension L2 to less than the dimension L1, thereby allowing introduction of the end portions 32, 34 into the receptacles 46, 48. With the end portions 32, 34 aligned at the receptacles 46, 48, the bowed rail assembly 26 can be relaxed to allow the ends 32, 34 to move into, and seat in, the receptacles 46, 48. Lengthwise shifting of the rail assembly 26 is confined by shoulders 58, 60, respectively on raised elements 62, 64 at the end portions 32, 34, respectively. The shoulders 58, 60 abut to the edges 50, 51 on the raised portions 42, 44 to limit opposite lengthwise shifting of the rail assembly 26.

Figure 10:
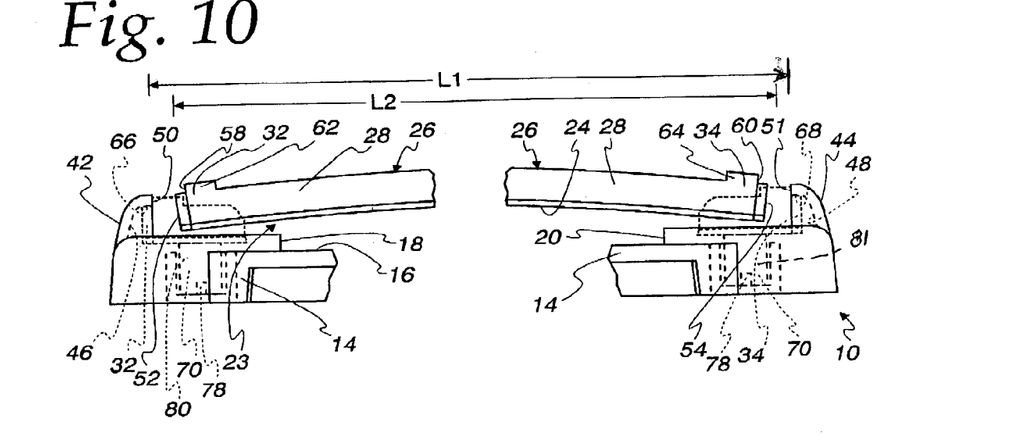
FIG. 10 is a fragmentary, front elevation view of the sheet cutting apparatus in FIGS. 1-5 and showing the rail assembly bent to facilitate its installation.

Once seated, as shown in dotted lines in FIG. 10, the end portions 32, 34 are biased upwardly against surfaces 66, 68, bounding the receptacles 46, 48, by identical leaf springs 70. The interaction between the springs 70 and each end portion 32, 34 is the same. As seen in FIGS. 6-9, each spring 70 has a generally V-shaped body 72 with outturned ends 74, 76. Mounting posts 78 on the base 14 project through an opening 80 in each leaf spring body 72 to maintain the leaf springs 70 in an operative position within spaced receptacles 80, 81, respectively beneath the rail end portions 32, 34.

Figure 6:
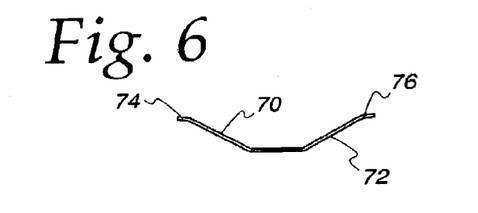
FIG. 6 is an enlarged, side elevation view of a spring used to support one end of the rail assembly for floating vertical movement.
Figure 7:
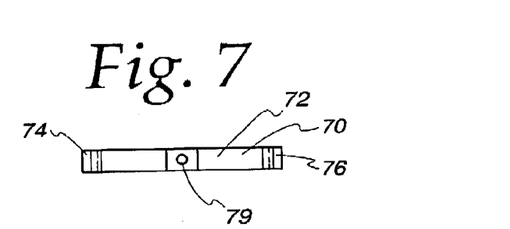
FIG. 7 is an enlarged, plan view of the spring in FIG. 6.
Figure 8:
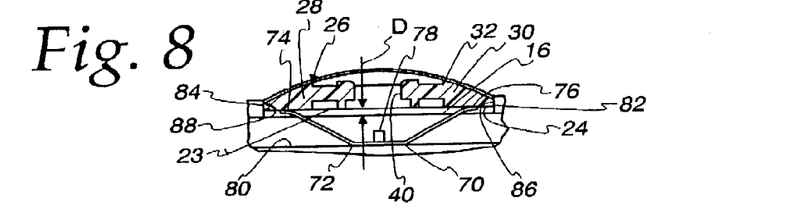
FIG. 8 is an enlarged, fragmentary, side elevation view of the spring in FIGS. 6 and 7 in an operative position and with the rail assembly in a position wherein a space for sheet material between the base and rail assembly is maximized.
Figure 9:
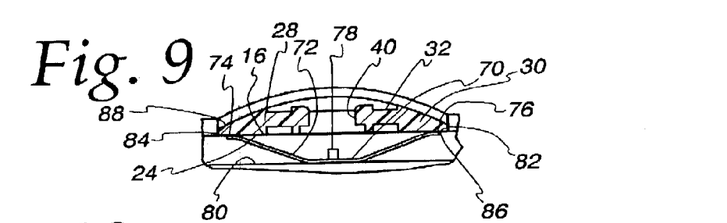
FIG. 9 is a view as in FIG. 8 wherein the rail assembly is pressed downwardly to reduce the vertical dimension of the space for the sheet material.

The spring 70 is shown in FIG. 6 in an undeformed state. By introducing the end portion 32 into the receptacle 42, the end portion 32 becomes resiliently supported upon the outturned ends 74, 76 of the spring 70. As this occurs, the spring 70 is slightly loaded by being compressed downwardly, as shown in FIG. 8, so as to resiliently bias the rail assembly 26 upwardly. In this state, the space 23 between the surfaces 16, 24, which accommodates the sheet product 12, has a maximum dimension D. The rail assembly 26 can be pressed downwardly to bring the surfaces 16, 24 into abutting relationship and to thereby virtually eliminate the space 23. Accordingly, the user can press the rail assembly 26 downwardly towards the support surface 16 to captively hold the sheet product 12, be it one or a multitude of layers.

The rail assembly 26 is confined against skewing in a plane parallel to the plane of the support surface 18 by the cooperation between edges 82, 84 on the rail assembly 26 and confronting surfaces on each of the raised portions 42, 44. The raised portion 42 has edges 86, 88 which abut to the rail assembly edges 82, 84. Edges 90, 92 on the raised part 44 and the edges 82, 84 cooperate in like manner. The cooperating edges 86, 88; 90, 92 and 82, 84 maintain the rail assembly 26 in a desired orientation within a horizontal plane. Accordingly, the rail assembly end portions 32, 34 are fixed against substantially all but vertical floating movement relative to the raised portions 42, 44.

Figure 11:
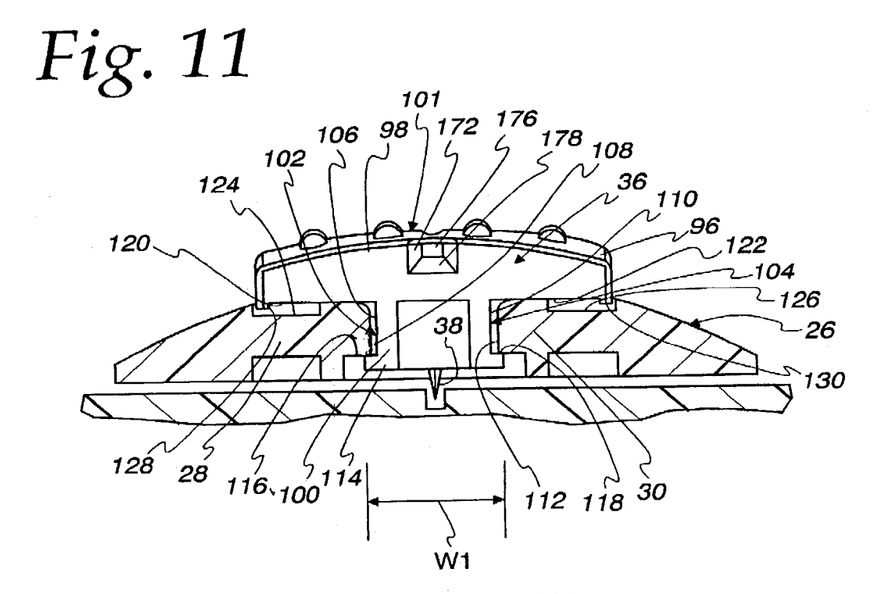
FIG. 11 is an enlarged, fragmentary, cross-sectional view of the sheet cutting apparatus taken along line 11-11 of FIG. 5.
Figure 12:
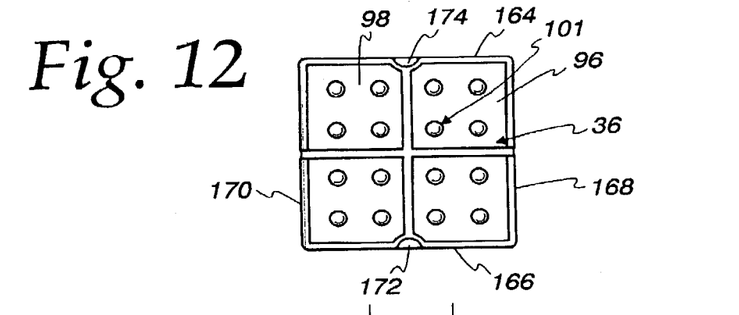
FIG. 12 is an enlarged, plan view of the cutting blade assembly on the sheet cutting apparatus of FIGS. 1-5.
Figure 13:
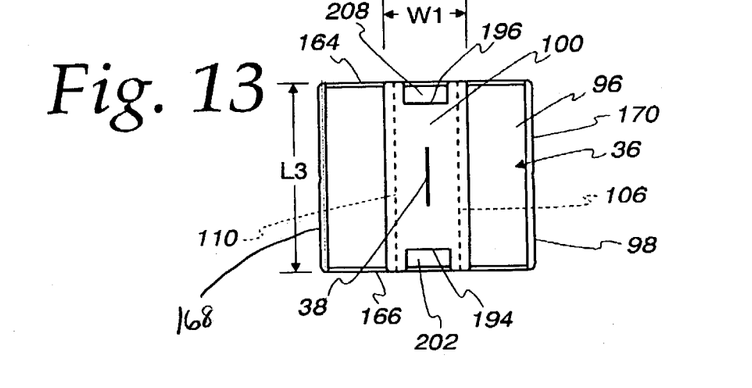
FIG. 13 is an enlarged, bottom view of the blade assembly in FIG. 12.

The invention is principally concerned with the cooperation between the blade assembly 36 and the rail assembly 26. As seen in FIGS. 11-13, the blade assembly 36 consists of a molded body 96 with a generally squared gripping portion 98 from which a stem 100 depends. The gripping portion 100 has a textured upper surface 101 to facilitate a comfortable frictional engagement by a user's finger. The cutting blade 38 is embedded in the stem 100. The stem 100, as viewed from the ends thereof, has an inverted "T" shape, which defines, in conjunction with the gripping portion 98, oppositely opening, U-shaped receptacles 102, 104 to respectively receive the rail portions 28, 30, with the blade assembly 36 in the operative state of FIG. 11. The receptacle 102 is bounded by a base portion 106, which is straight and extends the full length L3 of the body 96. The base portion 106 confronts a straight, free edge 108 on the first rail portion 28. A like base portion 110 bounding the receptacle 104 confronts a free edge 112 on the rail portion 30 along an equal length L3. With the blade assembly 36 in the operative state of FIG. 11, movement of the blade assembly 36 along the line L in FIG. 1 in its cutting path is guided by the cooperating base portions and free edges 106, 108 and 110, 112 on the blade assembly 36 and rail assembly 26.

The cross bar 114 of the "T" on the stem 100 defines upwardly facing surfaces 116, 118, which respectively cooperate with downwardly facing surfaces 120, 122 on the gripping portion 98 to captively hold the rail portions 28, 30 in place in a vertical direction. The rail portions 28, 30 have undercuts 124, 126 which receive depending arms 128, 130 on the gripping portion 98.

The rail assembly 26 and blade assembly 36 are designed so that the blade assembly 36 can be separated therefrom, as to effect change or repair of the blade assembly 36. Separation of the blade assembly 36 is accomplished by enlarging the width W (FIG. 5) of the slot 40 sufficiently to allow passage therethrough of the width W1 (FIG. 11) of the crossbar 114 on the stem 100. At the ends of the rail assembly, the spacing between the rail portions 28, 30 is maintained by the end portions 32, 34. The greatest flexibility of the rail portions 28, 30 exists midway between the end portions 32, 34. It is at this location that installation and removal of the blade assembly 36 preferably takes place.

In one form of the invention, the entire rail assembly 26, or at least the rail portions 28, 30, are made from a plastic material. The greater the rigidity of the rail portions 28, 30, the more exact is the guiding of the blade assembly 36 in the cutting line L. As noted in the background portion herein, the goal of accurately guiding movement of the blade assembly 36 competes with the goal of allowing the rail portions 28, 30 to be separated to facilitate installation and separation of the blade assembly 36. According to the invention, a change tool 142 is utilized to remove the blade assembly 36 from its operative position and also may be used to effect installation of the blade assembly 36 into its operative state. Use of the change tool 142 facilitates the installation/separation of the blade assembly 36 even if the rail portions 28, 30 are quite rigid and inflexible so that good cutting accuracy can be maintained. Details of the cutting tool 142, and its cooperation with the rail assembly 26, will now be described with respect to FIGS. 5 and 11-21.

Figures 14, 15, 16, 17:
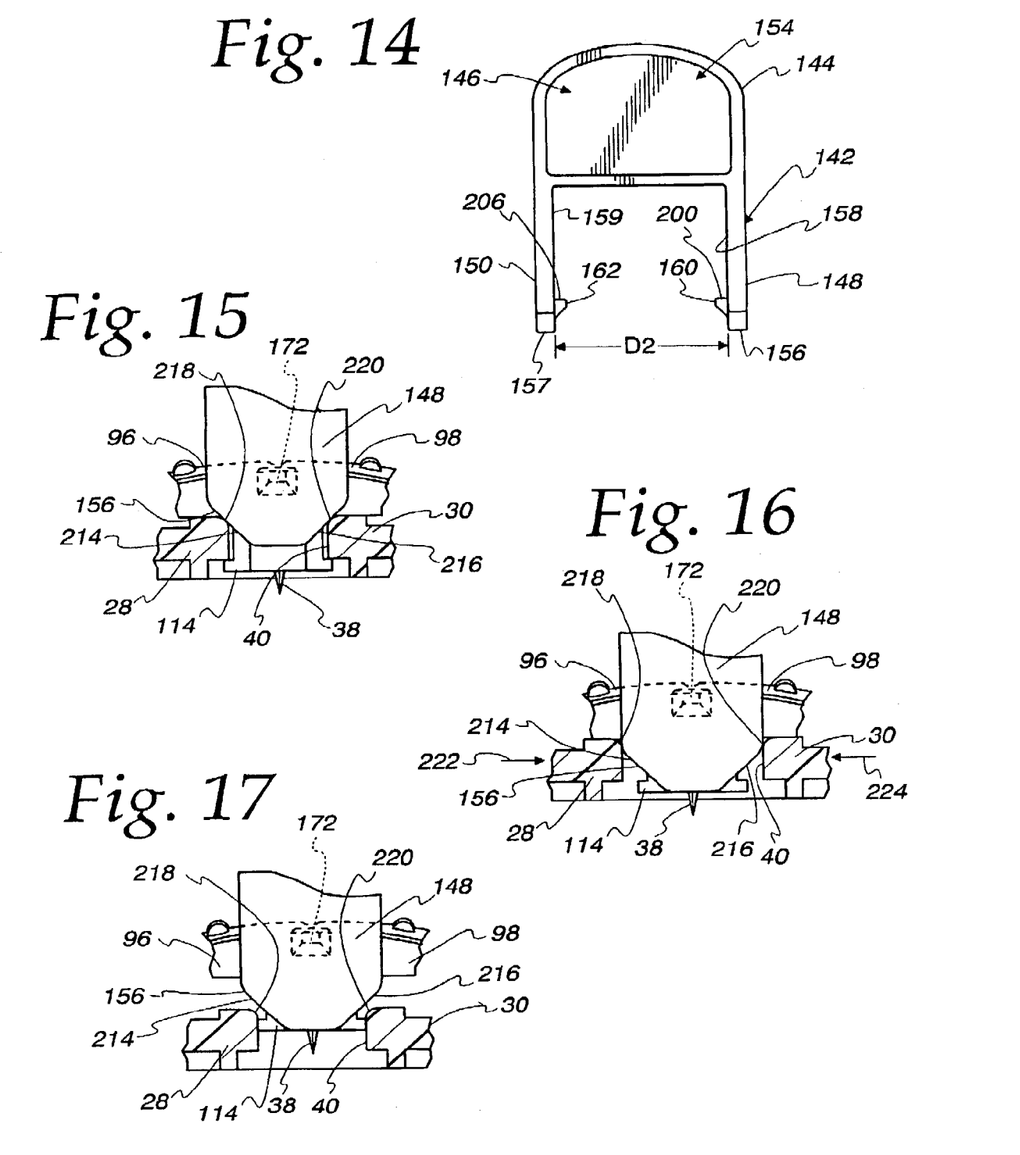

The change tool 142 consists of a generally U-shaped body 144 with a base portion 146, from which first and second legs 148, 150, project. The base portion 146 has undercut, oppositely opening, receptacles 152, 154, within which a user's fingers can be situated to grasp the tool 142. The legs 148, 150 have divergent, cam surfaces 156, 157 at their free ends. The legs 148, 150 have facing surfaces 158, 159 from which first and second projections 160, 162 extend. The first and second legs 148, 150, including the projections 160, 162, have the same construction and are mounted to the base portion 146 so as to be mirror images of each other.

The facing leg surfaces 158, 159 are spaced from each other a set distance D2 (FIG. 14), which is slightly greater than the dimension L3 (FIG. 13) between oppositely facing surfaces 164, 166 of the gripping portion 98 of the body 96 of the blade assembly 36.

To effect removal of the blade assembly 36 from its operative state, the change tool 142 is aligned over the blade assembly 36 in an orientation wherein the legs 148, 150 extend generally vertically. The legs 148, 150 in this first orientation are situated to straddle the surfaces 164, 166 on the body 96 of the blade assembly 38, midway between oppositely facing surfaces 168, 170, each extending between the surfaces 164, 166 on the body 96 of the blade assembly 36. This situates the projections 160, 162 respectively over guide receptacles 172, 174 formed in the gripping portion 98 of the body 96 on the blade assembly 36.

The guide receptacles 172, 174 have the same configuration. Exemplary guide receptacle 172, as shown in detail in FIG. 11, has a vertically extending portion 176 which blends into a concave, upwardly opening shoulder portion 178. The cooperating projections 160, 162 and guide receptacles 172, 174 guide movement of the change tool 142 in a predetermined path relative to the blade assembly 36.

Figure 18:
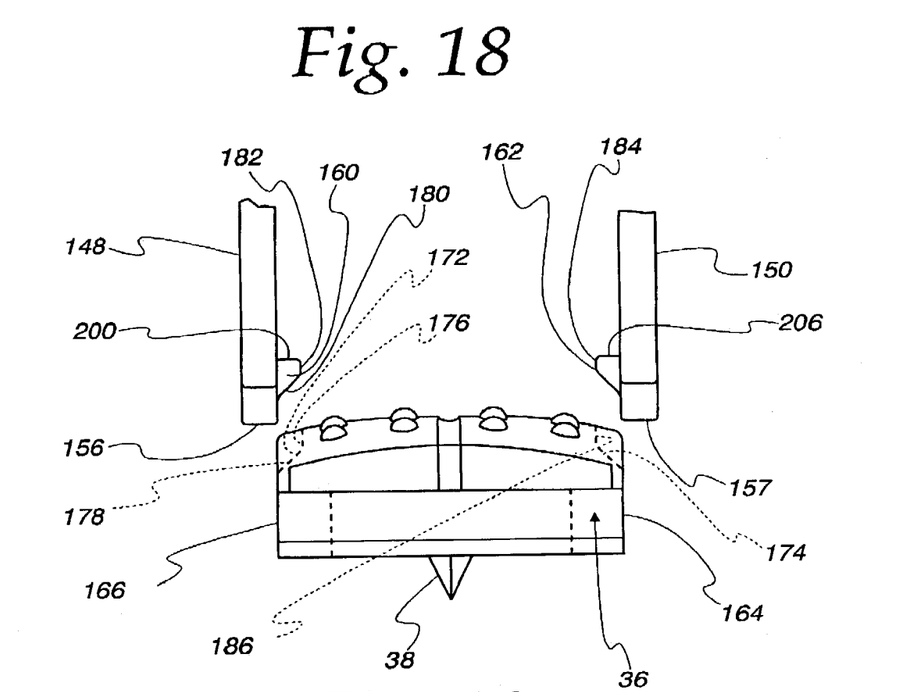
Figure 19:
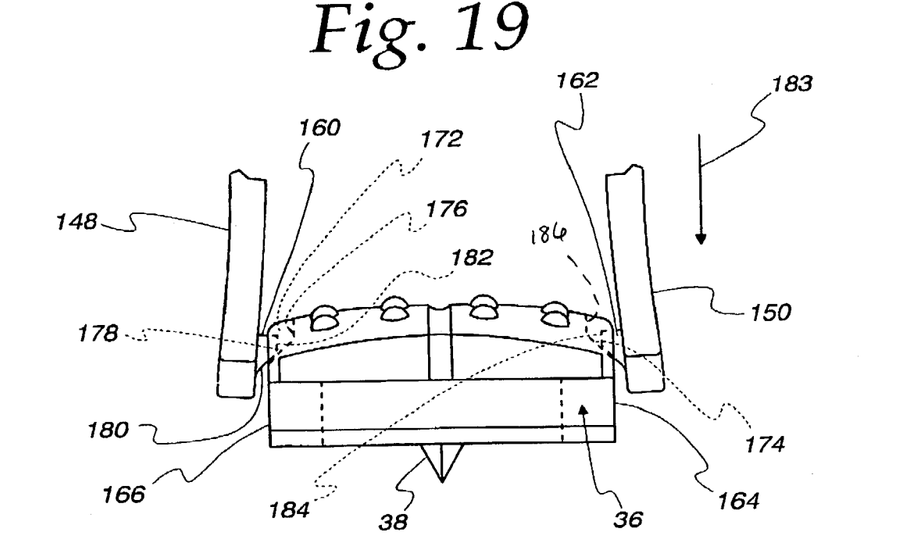
Figure 20:
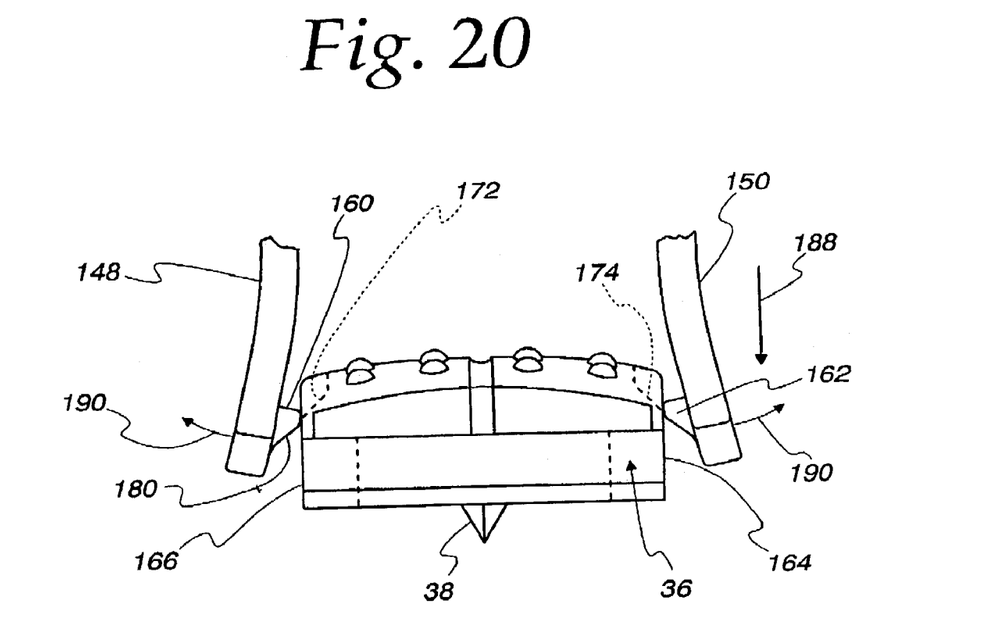
Figure 21:
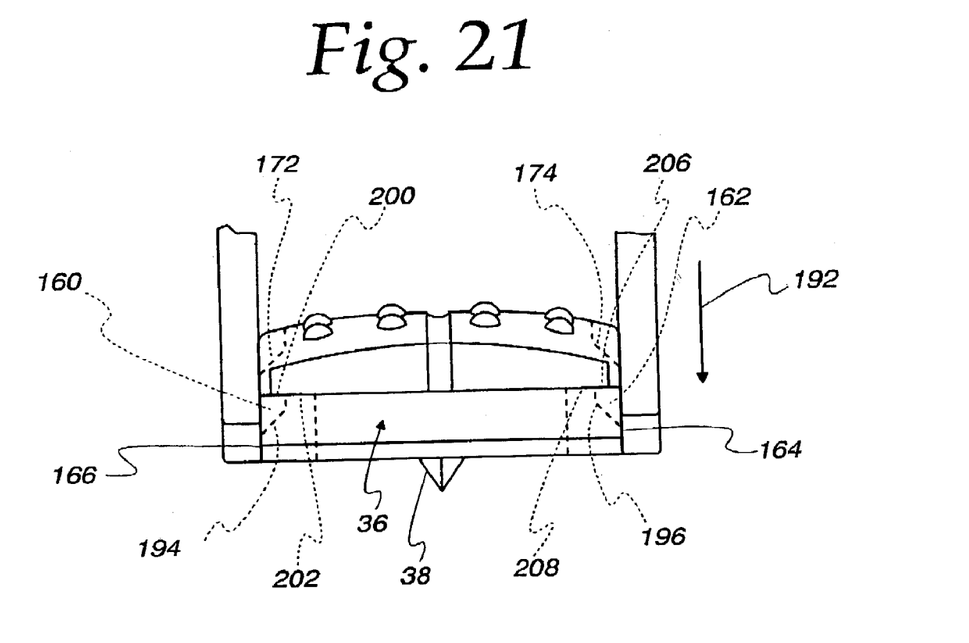

Referring to FIGS. 18-21, a sequence of steps for moving the change tool 142 in the predetermined path from a first, separated position in FIG. 18, to a second, fully engaged position in FIG. 21, is shown. Since the cooperation between each of the legs 148, 150 and projections 160, 162 and the blade assembly 36 is the same, the cooperation between exemplary leg 148 and projection 160 will be described in the sequenced drawings in FIGS. 18-21.

In FIG. 18, the change tool 142 has the previously described orientation with the legs 148, 150 aligned over the guide receptacles 172, 174. By pressing down on the change tool 142, the projection 160 moves into the guide receptacle 172 simultaneously as the projection 162 moves into the guide receptacle 174. The projection 160 has an angled cam surface 180 and a free end 182. As downward movement of the change tool 142 continues in the direction of the arrow 184 in FIG. 19, the cam surface 180 and free end 182 on the projection 160 cooperate with the receptacle portions 176, 178 to guide the leg 148 to the FIG. 19 position. In the FIG. 19 position, the free end 182 of the projection 160 aligns with the vertically extending portion 176 of the guide receptacle 172. A corresponding free end 184 on the projection 162 aligns with the vertically extending portion 186 of the guide receptacle 174, corresponding to the vertically extending portion 176. The spacing between the free ends 182, 184 of the projections 160, 162 is slightly less than the spacing between the vertically extending portions 176, 186. As a result, the legs 150 deform and bow slightly outwardly, which is shown in an exaggerated state in FIG. 19, so that there is a residual, captive, bias force produced by the free ends 182, 184 of the projections 160, 162 upon the body 96 of the blade assembly 36. In this position, the cam surface 180 is at, or immediately adjacent to, the upwardly opening portion 178. In FIG. 19 the change tool 142 is shown moved slightly downwardly from the holding position wherein the free ends 182, 194 captively grip the vertically extending portions 176, 186.

Continued downward movement from the FIG. 19 position, as shown by the arrow 188 in FIG. 20, causes the cam surface 180 to act against the surface portion 178 bounding the guide receptacle 172 to thereby cam the leg 148 outwardly, as indicated by the arrow 190. In the FIG. 20 position, the projection 160 has ridden through and out of the guide receptacle 172 so that the free end 182 of the projection 160 is abutted to the outside surface 166 of the body 96 of the blade assembly 36. The outside surface 16 and free end 182 cooperate to produce a further camming action between the leg 148 and blade assembly 36.

Continued downward movement of the change tool 142 from the FIG. 20 position, as indicated by the arrow 192 in FIG. 21, causes the projection 160 to align with the receptacle 194, simultaneously as the projection 162 aligns with the receptacle 196 in the body 96 of the blade assembly 36. The receptacles 194, 196 can be seen clearly in FIG. 21 in conjunction with FIG. 13. Once this alignment is achieved, the legs 148, 150, which are deformed as in FIG. 20, spring back towards, or fully into, an undeformed state, whereupon the projections 160, 162 are driven into the receptacles 194, 196. As this occurs, an upwardly facing shoulder 200 on the projection 160 is situated in confronting relationship with a downwardly facing shoulder 202 that bounds the receptacle 194. Similarly, a shoulder 206 on the projection 162 is situated in confronting relationship with a shoulder 208 bounding the receptacle 196. With this arrangement, the grasped change tool 142 can be drawn upwardly, thereby causing the shoulders 200, 206 on the change tool 142 to exert an upward force on the blade assembly 36, through the shoulders 202, 208, to effect extraction thereof, i.e. removal from the operative state.

In FIGS. 15-17, a sequence of drawings is shown for the change tool 142 being moved downwardly, as in FIGS. 18-21, but from a prospective rotated 90° from that in FIGS. 18-21. In FIGS. 15-17, the interaction of exemplary leg 148 with the blade assembly 36 is shown. The leg 150 operates simultaneously in the same manner.

The cam surface 156 on the leg 148 has a truncated, V-shaped configuration with angled cam edge portions 214, 216. The cam edge portions 214, 216 are configured to cooperate with corners 218, 220 on the rail portions 28, 30, respectively.

As the change tool 142 moves downwardly into a position corresponding to that in FIG. 19, the cam edge portions 214, 216 simultaneously engage the corners 218, 220, as shown in FIG. 15. Continued downward movement causes the rail portions 28, 30 to be wedged by the cam edge portions 214, 216 to thereby progressively separate, and in so doing, enlarging the slot 40 to the point in FIG. 16 wherein it will accommodate the full width W1 (FIGS. 11 and 13) of the cross bar 114 on the stem 100 on the sleeve assembly 36. The FIG. 16 position for the change tool 142 corresponds to the FIG. 21 position wherein the projections 160, 162 seat in the receptacles 194, 196. In this state, there is a residual force stored in the rail portions 28, 30, tending to urge them towards each other, as indicated by the arrows 222, 224 in FIG. 16. By releasing the downward force upon the change tool 142 in the FIG. 16 state, the restoring force in the rail portions 28, 30 causes the corners 218, 220 to exert an outward camming force on the legs 148, 150. This, in effect, causes the blade assembly 36 to spring out of the slot 40, as shown in FIG. 17, into a separated state. The change tool 142 can then be conveniently separated from the blade assembly 36.

In summary, with the blade assembly 36 in its operative state, the change tool 142 can be moved from its first separated position into the second position shown in FIGS. 16 and 21, wherein the change tool 142 and blade assembly 36 are releasably maintained together in a predetermined relationship and the slot 40 is enlarged to allow passage through of the stem 100 of the blade assembly 36. By then releasing the downward force, the blade assembly 36 releases itself together with the change tool 142. The rail assembly can thus be reconfigured through the change tool 142, without requiring disassembly of any part of the rail assembly, by translational movement of the change tool 142 to and against the rail assembly thereby to allow the blade assembly 36 to be changed from its operative state into its separated state.

The change tool 142 can likewise be used to facilitate placement of the blade assembly 36 into the operative state. By placing the change tool 142 and blade assembly 36 in the FIG. 19 state and more preferably with the change tool 142 moved slightly upwardly therefrom so that the free ends 182, 184 grip the vertically extending portions 176, 186, the change tool 142 and blade assembly 36 are releasably maintained together with the projections 160, 162 residing in their respective receptacles 172, 174. The change tool 142, with the blade assembly 36 held thereby, can be moved to a position wherein the blade assembly 36 is aligned over the slot 40. By then exerting a downward pressure, the change tool 142 assists the advancement of the blade assembly 36 into the operative position.

Figure 22:
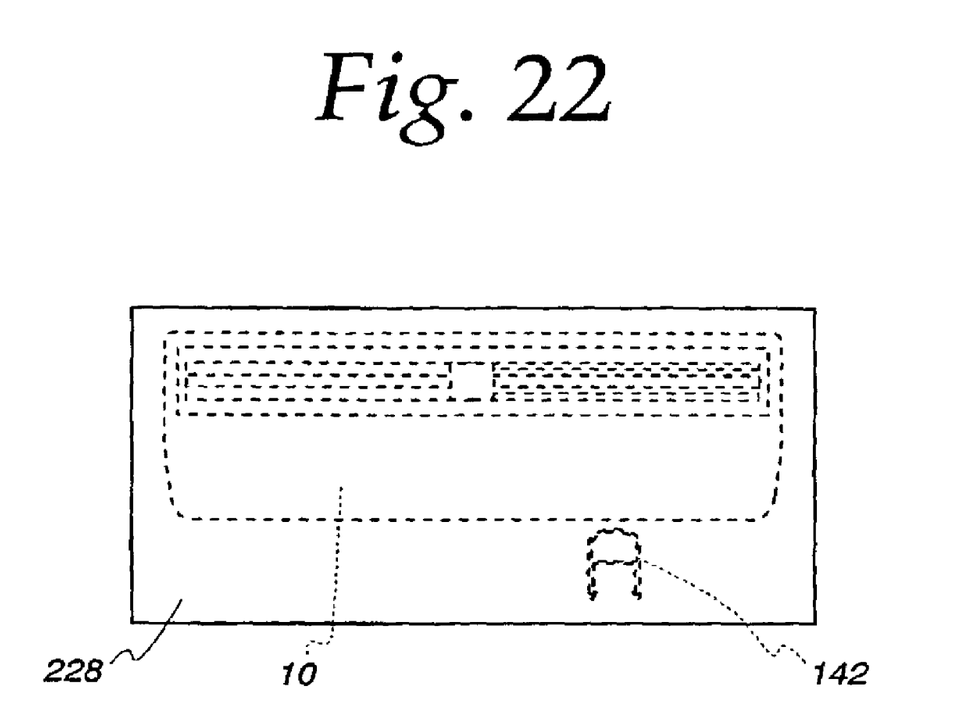
FIG. 22 is a plan view of a kit including a sheet cutting assembly, change tool, and package therefor.

As shown in FIG. 22, the sheet cutting apparatus 10 can be sold in conjunction with the change tool 142 as a kit. In FIG. 22, a container 228 maintains the sheet cutting assembly 10 and change tool 142 in a unitary package that is suitable for display.

Many variations of the above structure are contemplated. As one example, cooperating all male and female components can be reversed from the structure shown. For example, the projections 160, 162 could be on the blade assembly 36, with the cooperating guide receptacles 172, 174 being on the change tool 142.

The foregoing disclosure of specific embodiments is intended to be illustrative of the broad concepts comprehended by the invention.

The invention claimed is:

1. In combination:
a) a sheet cutting apparatus comprising:
a base comprising a surface for supporting a sheet material operatively positioned upon the base;
a rail assembly on the base comprising first and second rail portions with spaced ends,
the rail assembly having a length; and
a blade assembly,
the blade assembly having an operative state in which the blade assembly is movable guidingly in a cutting path along the length of the rail assembly to make a cut in a sheet material operatively positioned upon the base, and repositionable relative to the rail assembly from the operative state into a separated state; and
b) a tool having first and second legs spaced from each other a set distance,
the tool operable by a user to facilitate repositioning of the blade assembly from the operative state into the separated state,
the tool and rail assembly configured to cooperate with each other such that with the tool aligned in a first separated position relative to the rail assembly and directed from the first position translatingly against the rail assembly to a second position, the first and second legs simultaneously engage the rail assembly so as to each exert a force on the rail assembly at spaced locations to thereby change a spacing between the rail portions at a location spaced from the ends of the rail portions to allow the blade assembly to be changed from the operative state into the separated state without requiring disassembly of any part of the rail assembly and without changing a spacing between the rail portions at the spaced ends of the rail portions.

2. The combination according to claim 1 further comprising a container for maintaining the sheet cutting assembly and tool in a unitary package.

3. The combination according to claim 1 wherein the tool exerts a camming action under a force applied to the rail assembly by the tool as the tool is translatingly moved from a first separated position against the rail assembly to the second position, whereupon the blade assembly can be changed from the operative state to the separated state, the tool and rail assembly configured such that upon release of the applied force the rail assembly urges the tool from the second position towards the first separated position and the blade assembly from the operative state towards the separated state.

4. The combination according to claim 3 wherein the blade assembly and tool have shoulders that confront each other with the tool in the second position such that the shoulder on the tool draws the shoulder on the blade assembly to cause the blade assembly to follow movement of the tool from the second position towards the first separated position.

5. In combination:
a) a sheet cutting apparatus comprising:
a base comprising a surface for supporting a sheet material operatively positioned upon the base;
a rail assembly on the base,
the rail assembly having a length; and
a blade assembly,
the blade assembly having an operative state in which the blade assembly is movable guidingly in a cutting path along the length of the rail assembly to make a cut in a sheet material operatively positioned upon the base, and repositionable relative to the rail assembly from the operative state into a separated state; and
b) a tool having a first shoulder,
the tool operable by a user to facilitate repositioning of the blade assembly from the operative state into the separated state,
wherein the tool is movable relative to the blade assembly from a first separated position into a second position, the blade assembly having a second shoulder,
wherein as an incident only of the tool being moved relative to the blade assembly in a first direction from the first separated position into the second position, the first and second shoulders are situated in confronting relationship to block movement of the tool oppositely to the first direction relative to the blade assembly into the first position, whereby a force can be exerted on the tool to bear the first shoulder against the second shoulder so as to thereby draw the blade assembly from the operative state towards the separated state,
wherein the tool has a third shoulder and the blade assembly has a fourth shoulder and with the tool in the second position the third and fourth shoulders are situated in confronting relationship,
whereby a force can be exerted on the tool to simultaneously bear the third shoulder against the fourth shoulder and first shoulder against the second shoulder so as to thereby draw the blade assembly from the operative state towards the separated state.

6. The combination according to claim 5 wherein the tool has first and second spaced legs on which the first and third shoulders are respectively formed.

7. The combination according to claim 6 wherein the first and second legs are capable of straddling a portion of the blade assembly.

8. In combination:
a) a sheet cutting apparatus comprising:
a base comprising a surface for supporting a sheet material operatively positioned upon the base;
a rail assembly on the base,
the rail assembly having a length; and
a blade assembly,
the blade assembly having an operative state in which the blade assembly is movable guidingly in a cutting path along the length of the rail assembly to make a cut in a sheet material operatively positioned upon the base, and repositionable relative to the rail assembly from the operative state into a separated state; and
b) a tool,
the tool operable by a user to facilitate repositioning of the blade assembly from the operative state into the separated state,
wherein the tool and blade assembly can be moved against and relative to each other such that the tool is movable from a first separated position into a second position wherein the tool and blade assembly are releasably maintained together without any user interaction,
wherein the tool has first and second legs respectively with first and second projections, wherein the first and second projections project towards each other and are spaced from each other a first distance, as the tool is changed from the first position into the second position, a portion of the blade assembly having a width greater than the first distance passes between the first and second projections, and at least one of the first and second legs is repositionable to allow the projections to become spaced from each other by a distance greater than the first distance to allow the projections to move past the portion of the blade assembly and the tool to realize the second position, wherein with the tool in the second position spaced shoulders on the tool confront spaced shoulders on the blade assembly to block movement of the tool from the second position into the first separated position.

9. In combination:

a) a sheet cutting apparatus comprising:

a base comprising a surface for supporting a sheet material operatively positioned upon the base;

a rail assembly on the base, the rail assembly having a length; and a blade assembly, the blade assembly having an operative state in which the blade assembly is movable guidingly in a cutting path along the length of the rail assembly to make a cut in a sheet material operatively positioned upon the base, and repositionable relative to the rail assembly from the operative state into a separated state; and b) a tool, the tool operable by a user to facilitate repositioning of the blade assembly from the operative state into the separated state, wherein the rail assembly has first and second rail portions between which a part of the blade assembly resides with the blade assembly in the operative state, wherein the rail portions are spaced from each other a first distance with the blade assembly in the operative state, wherein the rail portions can be repositioned through the tool to be spaced from each other a second distance that is greater than the first distance to allow repositioning of the blade assembly from the operative state into the separated state, wherein the tool is configured to cam the rail portions from a first relative position wherein the rail portions are spaced from each other the first distance into a second relative position wherein the rail portions are spaced from each other the second distance by aligning the tool in a first orientation and exerting a force on the tool, and through the tool, against the rail assembly, wherein the tool has a first cam edge which acts against the first and second rail portions to produce a wedging action as a force is exerted on the tool with the tool in the first orientation, wherein the tool has spaced first and second legs which are capable of straddling a portion of the blade assembly and the first cam edge is defined on the first leg.

10. The combination according to claim 9 wherein the second leg has a second cam edge which acts against the first and second rail portions simultaneously with the first cam edge to produce a wedging action as a force is exerted on the tool with the tool in the first orientation.

11. The combination according to claim 9 wherein there is a first projection on the first leg and a second projection on the second leg, the blade assembly has first and second guide receptacles, and the first and second projections are movable respectively in the first and second guide receptacles with the tool in a first orientation and a force exerted on the tool to guide movement of the tool in a predetermined path to cause the first cam edge to produce the wedging action.

12. The combination according to claim 11 wherein the tool is movable relative to the blade assembly from a first separated position into a second position, the first projection has a first shoulder and the blade assembly has a second shoulder and with the tool in the second position the first and second shoulders are situated in confronting relationship whereby a force can be exerted on the tool to bear the first shoulder against the second shoulder so as to thereby draw the blade assembly from the operative state towards the separated state.

13. The combination according to claim 12 wherein the second projection has a third shoulder and the blade assembly has a fourth shoulder and with the tool in the second position the third and fourth shoulders are situated in confronting relationship whereby a force can be exerted on the tool to simultaneously bear the third shoulder against the fourth shoulder and first shoulder against the second shoulder so as to thereby draw the blade assembly from the operative state towards the separated state.

14. The combination according to claim 13 wherein the first and second projections project towards each other and are spaced from each other a first distance, as the tool is changed from the first position into the second position, a portion of the blade assembly having a width greater than the first distance passes between the first and second projections, and at least one of the first and second legs is repositionable to allow the projections to become spaced from each other by a distance greater than the first distance to allow the projections to move past the portion of the blade assembly.

15. The combination according to claim 14 wherein the at least one of the first and second legs and blade assembly have cam surfaces which cooperate to bias the at least one leg away from the other leg as the tool is moved from the first position into the second position.

16. The combination according to claim 15 wherein the tool is generally U-shaped with a base from which the first and second legs project.

17. The combination according to claim 16 wherein the base has oppositely opening receptacles within which a user's fingers can be situated to grasp the tool.

18. The combination according to claim 16 wherein the first and second legs have substantially the same shape and are situated to be mirror images of each other.

19. The combination according to claim 16 wherein the tool comprises a single piece of molded plastic.

20. The combination according to claim 11 wherein the first guide receptacle terminates at a first shoulder, the second guide receptacle terminates at a second shoulder, and the first and second projections are abuttable respectively to the first and second shoulders to allow a force to be exerted on the tool that cause the blade assembly to be urged into the operative state.

21. The combination according to claim 20 wherein the projections produce a captive, bias force against the blade assembly with the first and second projections at or adjacent to the first and second shoulders so that the tool and blade assembly are releasably maintained together.

22. In combination:

a) a sheet cutting apparatus comprising:

a base comprising a surface for supporting a sheet material operatively positioned upon the base;

a rail assembly on the base, the rail assembly having a length; and a blade assembly, the blade assembly having an operative state in which the blade assembly is movable guidingly in a cutting path along the length of the rail assembly to make a cut in a sheet material operatively positioned upon the base, and repositionable relative to the rail assembly from the operative state into a separated state; and b) a tool, the tool operable by a user to facilitate repositioning of the blade assembly from the operative state into the separated state, wherein the rail assembly has first and second rail portions between which a part of the blade assembly resides with the blade assembly in the operative state, wherein the rail portions are spaced from each other a first distance with the blade assembly in the operative state, wherein the rail portions can be repositioned through the tool to be spaced from each other a second distance that is greater than the first distance to allow repositioning of the blade assembly from the operative state into the separated state, wherein the tool is configured to cam the rail portions from a first relative position wherein the rail portions are spaced from each other the first distance into a second relative position wherein the rail portions are spaced from each other the second distance by aligning the tool in a first orientation and exerting a force on the tool, and through the tool, against the rail assembly, wherein the tool has a first leg on which the first cam edge is defined and there is a first projection on one of the first leg and blade assembly and a first guide receptacle for the first projection on the other of the first leg and blade assembly, the first projection and guide receptacle cooperating to guide movement of the tool in a predetermined path relative to the blade assembly with the tool in the first orientation to cause the first cam edge to produce the wedging action.

23. In combination:

a) a sheet cutting apparatus comprising:

a base comprising a surface for supporting a sheet material operatively positioned upon the base;

a rail assembly on the base, the rail assembly having a length; and a blade assembly, the blade assembly having an operative state in which the blade assembly is movable guidingly in a cutting path along the length of the rail assembly to make a cut in a sheet material operatively positioned upon the base, and repositionable relative to the rail assembly from the operative state into a separated state; and b) a tool having first and second legs spaced from each other a set distance, the tool operable by a user to facilitate repositioning of the blade assembly from the operative state into the separated state, the tool and rail assembly configured to cooperate with each other such that with the tool aligned in a first separated position relative to the rail assembly and directed from the first position translatingly against the rail assembly to a second position, the tool reconfigures the rail assembly to allow the blade assembly to be changed from the operative state into the separated state without requiring disassembly of any part of the rail assembly, wherein the rail assembly has first and second rail portions between which a part of the blade assembly resides with the blade assembly in the operative state, wherein the rail portions are spaced from each other a first distance with the blade assembly in the operative state, wherein as an incident of the tool being translated from the first position to against the rail assembly, the rail portions are both simultaneously engaged by both the first and second legs at spaced locations and repositioned by each of the first and second legs to be spaced from each other a second distance that is greater than the first distance to allow repositioning of the blade assembly from the operative state into the separated state.

24. In combination a) a sheet cutting apparatus comprising:

a base comprising a surface for supporting a sheet material operatively positioned upon the base;

a rail assembly on the base, the rail assembly having a length; and a blade assembly, the blade assembly having an operative state in which the blade assembly is movable guidingly in a cutting path along the length of the rail assembly to make a cut in a sheet material operatively positioned upon the base, and repositionable relative to the rail assembly from the operative state into a separated state; and b) a tool having a first shoulder, the tool operable by a user to facilitate repositioning of the blade assembly from the operative state into the separated state, wherein the tool is movable relative to the blade assembly from a first separated position into a second position, the blade assembly having a second shoulder, wherein with the tool in the second position, the first and second shoulders are situated in confronting relationship whereby a force can be exerted on the tool to bear the first shoulder against the second shoulder so as to thereby draw the blade assembly from the operative state towards the separated state, wherein the tool has a third shoulder and the blade assembly has a fourth shoulder and with the tool in the second position the third and fourth shoulders are situated in confronting relationship, whereby a force can be exerted on the tool to simultaneously bear the third shoulder against the fourth shoulder and the first shoulder against the second shoulder so as to thereby draw the blade assembly from the operative state towards the separated state, wherein the tool has first and second spaced legs on which the first and third shoulders are respectively formed, wherein at least one of the first and second legs and blade assembly have cam surfaces which cooperate to bias the at least one leg away from the other leg as the tool is moved from the first position into the second position.

* * * * *